UNITED STATES PATENT OFFICE.

WILLIAM H. MARSHALL, OF CLEVELAND, OHIO.

CARBON APPARATUS AND MACHINERY.

SPECIFICATION forming part of Letters Patent No. 687,893, dated December 3, 1901.

Application filed April 12, 1901. Serial No. 55,479. (No model.)

*To all whom it may concern:*

Be it known that I, WILLIAM H. MARSHALL, a citizen of the United States, residing at Cleveland, in the county of Cuyahoga and State of Ohio, have invented certain new and useful Improvements in Carbon Apparatus and Machinery; and I do declare that the following is a full, clear, and exact description of the invention, which will enable others skilled in the art to which it appertains to make and use the same.

My invention relates to a new and original lining, coating, facing, or covering for apparatus and machinery employed in the manufacture of electric-light carbons or raw materials for such carbons, the same including each and all of the numerous individual parts or devices wherein the material for making the carbons is in any wise handled or prepared or in or by which the carbons as such are ultimately produced, the same comprising, first, a carbon-lined retort or furnace for the manufacture of lampblack or tar; second, a carbon-lined chamber or receptacle for settling lampblack or tar; third, a carbon-lined mixing apparatus for mixing tar and lampblack; fourth, carbon-rolls or carbon-covered rolls for mixing or condensing lampblack and tar or calcined lampblack and tar; fifth, carbon-lined retorts or furnaces for calcining or igniting condensed or mixed and condensed lampblack and tar; sixth, carbon-lined mills containing carbon-balls or carbon-covered balls for grinding; seventh, mills with carbon facings for grinding; eighth, carbon-lined furnaces or retorts for baking, and, ninth, generally the use of an exclusive carbon surface where hitherto other surfaces have been used and which have always been more or less deleterious to the carbon product because of their foreign nature, and therefore natural impurity.

In the efforts heretofore made to manufacture high-grade carbons there has been a constant drawback and difficulty confronted by reason of the impurities that creep in here and there in the manufacture, notwithstanding all the precautions at every point and the employment of apparatus which has been as free as possible itself from such impurities, and from danger of shedding foreign particles into the carbon-stock. Yet, notwithstanding all these precautions and the exercise of much expensive care for cleanliness at every point, it remains true that a percentage of corrupting and depreciating matter has always worked into the stock as it passed through the various stages of preparation, so that in the end a perfectly or practically clean carbon has not heretofore been obtained as a uniform and standard article of manufacture. Individual and exceptional carbons were practically pure and clean, but not the run of the factory nor any certain number at any time. The impurities entering into its construction were, moreover, generally such as came from the apparatus in or within which the carbon was being developed in manufacture and consisted of particles or possibly small flaky detachments from the brick, mortar, iron, steel, or other materials not carbon of an earthy or other injurious nature with which retorts, furnaces, chambers, and other apparatus or machinery have hitherto been lined, covered, faced, or equipped. Such apparatus answers well enough for the cheaper grades of carbons; but it has been found altogether insufficient and defective for the production of carbons of the highest and purest grade, which are now in such large demand and which must be wholly devoid of all deleterious and corrupting particles or substances.

It is, therefore, the object of my invention to produce such perfect carbons as the normal and uniform output of a factory, and this I accomplish by employing a carbon lining for all furnaces, retorts, chambers, compartments, receptacles, and other like utilities wherein the material is handled in any of the processes of its preparation early or late and by providing a carbon covering for crushing rolls, balls, and other surfaces and means employed immediately or remotely in the production of the finished carbon. This means that all my apparatus throughout the factory is under a carbon coating of more or less depth and applied or affixed one way or another, according to the character of the apparatus or part. To these ends the lampblack or retort-carbon is produced only in carbon-lined apparatus and the calcining is done in carbon-lined retorts, and only carbon surfaces are employed in all the processes and stages of production throughout the factory where hitherto earthy or other depreciating materials were used.

If a lining is desired, it is my practice to provide blocks, bricks, or sections of carbon of suitable thickness and shape to serve the purpose, and the edges of said parts are preferably made to interlock or to key or be keyed together or fastened by means of carbon in a plastic form rather than resort to mortar or other like means as might introduce impurities for securing them in place. If a roll or other part is to be covered, I have the carbon cast or fashioned to conform thereto or thereon, and the lining blocks, slabs, or bricks, as well as the other parts of the carbon prepared for these purposes, are made as compact and dense as possible to prolong their serviceability.

The rolls and balls herein referred to may be either solid carbon throughout or have cores faced, coated, or covered with carbon, and if so faced or covered the carbon may be applied as a paste or in other plastic or pliable form, and the linings of chambers or other receptacles, tanks, vats, furnaces, and the like may likewise have their working or exposed surfaces covered, coated, or lined in a like manner or in any manner that is found practicable. The invention therefore consists more in the having of a carbon faced or covered surface piece or part for use in carbon manufacture to exclude deleterious substance and preserve carbon purity than in any special shapes or forms into which the carbon may be wrought to effect this result or in the manner of its application or use.

What I claim is—

The method herein described of preserving arc-light carbons from impurities in the course of their manufacture, the same consisting in providing all inner exposed surfaces of the apparatus through which the carbon-stock passes with a carbon cover, substantially as described.

Witness my hand to the foregoing specification this 27th day of March, 1901.

WILLIAM H. MARSHALL.

Witnesses:
   R. B. MOSER,
   H. E. MUDRA.